United States Patent [19]

Shogren et al.

[11] Patent Number: 5,756,194
[45] Date of Patent: May 26, 1998

[54] ENHANCED WATER RESISTANCE OF STARCH-BASED MATERIALS

[75] Inventors: Randal L. Shogren, Peoria; John W. Lawton, Chillicothe, both of Ill.

[73] Assignee: The United States of America, as represented by the Secretary of Agriculture, Washington, D.C.

[21] Appl. No.: 591,923

[22] Filed: Jan. 25, 1996

[51] Int. Cl.$^6$ .................................................. B32B 03/26
[52] U.S. Cl. ........................... 428/312.4; 428/312.2; 428/480; 428/497; 428/498; 428/532
[58] Field of Search ........................... 428/312.2, 312.4, 428/480, 497, 498, 532

[56] References Cited

U.S. PATENT DOCUMENTS

| | | | |
|---|---|---|---|
| 5,219,646 | 6/1993 | Gallagher et al. | 428/287 |
| 5,280,055 | 1/1994 | Tomka | 524/47 |
| 5,288,318 | 2/1994 | Mayer et al. | 106/213 |
| 5,391,423 | 2/1995 | Wnuk et al. | 428/217 |
| 5,512,378 | 4/1996 | Bastioli et al. | 428/484 |

FOREIGN PATENT DOCUMENTS

| | | |
|---|---|---|
| WO 90/01043 | 2/1990 | WIPO . |
| WO 94/13734 | 6/1994 | WIPO . |

OTHER PUBLICATIONS

Hawley's Condensed Chemical Dictionary. 12th Ed. pp. 579–580, 1012.

*Primary Examiner*—Helen Lee
*Attorney, Agent, or Firm*—M. Howard Silverstein; Joseph A. Lipovsky; John D. Fado

[57] ABSTRACT

Molded products made from gelatinized starch can be made water-resistant by coating with biodegradable polyesters such as poly(beta-hydroxybutyrate-co-valerate) (PHBV), poly(lactic acid) (PLA), and poly(ϵ-caprolactone) (PCL). Adherence of the two dissimilar materials is achieved through the use of an intervening layer of a resinous material such as shellac or rosin which possesses a solubility parameter (hydrophobicity) intermediate to that of the starch and the polyesters. Coating is achieved by spraying an alcoholic solution of the shellac or rosin onto the starch-based article and subsequently coating with a solution of the polyester in an appropriate solvent. Biodegradable products made by the instant process have utility in the food service industry.

9 Claims, No Drawings

ENHANCED WATER RESISTANCE OF STARCH-BASED MATERIALS

BACKGROUND OF THE INVENTION

1. Field of the Invention

The use of starch as a biodegradable base material for articles such as dishes, utensils and bags is desirable as an environmentally friendly alternative to the present use of polyethylene and polystyrene. The use of starch in this manner, however, has been severely limited due to its lack of stability upon exposure to water. The present invention relates to coating starch-based articles with water-resistant biodegradable polyesters, so as to make them viable for a broader range of uses, including those typical of food preparation, packaging and consumption.

2. Description of the Prior Art

Disposable products made from polyethylene and polystyrene represent a five billion dollar per year industry. Single use items such as packaging film, foam, dishes, utensils and bags diminish non-renewable petroleum resources and, due to their non-biodegradability, create waste management problems. Concern over diminishing landfill space as well as the hazards of discarded plastics to wildlife has led to public and legislative demand for biodegradable alternatives to many synthetic plastic products.

Starch is a widely available biopolymer that, at $0.10/lb., is less expensive than polyethylene and polystyrene ($0.30–$0.50/lb.) as well as being readily biodegradable. The use of this material as a substitute for plastics has, however, been severely limited due to its strong hydrophilicity. Articles made from starch will swell and deform upon exposure to moisture, making them unsuitable for most packaging applications.

Attempts to overcome this problem have focused primarily on strategies of lamination or the creation of polymeric blends. Lay et al. in U.S. Pat. No. 5,095,054 disclose that destructurized starch is compatible in its processing with melts of hydrophobic thermoplastic materials and that their combination, upon solidification, in many instances shows enhanced structural stability in humid conditions while still retaining a high degree of biodegradability.

Gallagher et al. in U.S. Pat. No. 5,219,646 teach the blending of starch with polyesters for the production of biodegradable fibers, non-wovens, foams, films and disposable products such as diapers. Polyesters utilized are based upon polyethylene terephthalate copolymerized with other ingredients including non-aromatic acids, polyethylene ether groups and hydroxy acids. Envisioned uses include bags, bottles and cartons.

Tomka in U.S. Pat. No. 5,280,055 teaches the creation of a biodegradable mold material by mixing thermoplastically processable starch with a cellulose derivative, such as a cellulose ester. Compositionally, the mixture contains approximately 20–50% by volume of a starch component which is encapsulated in a matrix of cellulose ester, which comprises approximately 30–60% by volume of the mixture and may be cellulose acetate, cellulose propionate, cellulose butyrate, cellulose valerate or a mixture thereof. The mixture may also contain a phasing agent or a softener such as acetyl triethyl citrate or a phthalic acid ester to improve phase mixing.

Mayer et al. in U.S. Pat. No. 5,288,318 teach methods and compositions for making biodegradable injection molded parts. Compositions taught include from 30–70% cellulose acetate, from 10–60% unmodified raw starch and from 5–35% of a plasticizer such as a glycerol or glycerol acetate. The solid ingredients are combined and fed to an extruder to make pellets or to feed injection molding equipment.

The Derwent Abstract of WO 94/13734 teaches the preparation of water repellent or waterproof coatings for starch-based moldings. The methodology involves simultaneously applying a film forming substance, a solvated lacquer and a hydrophobic biodegradable plasticizer to the surface of a starch-based molding. Disclosed film-forming substances are cellulose acetates. The process and products are taught as being useful to waterproof biodegradable starch-based products used for food packaging.

Tomka et al. in WO 90/01043 disclose the coating of hydrophilic base materials such as starch with hydrophobic polymers such as poly(glycolic acid), poly(hydroxybutyric acid), poly(hydroxypropionic acid), poly(lactic acid) or poly(hydroxyvaleric acid). Improved adhesion between the coating and base materials is taught as being achieved by using a substance which dissolves, swells, or chemically reacts with the base material — with DMSO being specifically exemplified.

While various methodologies for rendering starch-based materials resistant to deformation by water exist; there remains a need for the creation of alternate viable and cost-effective systems for this purpose.

SUMMARY OF THE INVENTION

We have now discovered a process for the effective adhesion of water-resistant biodegradable polyester films to biodegradable starch-based materials. This method involves the application of a natural resin, such as shellac or pine rosin, in the form of a continuous or discontinuous layer to the surface of a starch-based article; followed by the subsequent application of a continuous layer of a water-resistant polyester. In the alternative, the natural resin may also be first applied to the polyester — with the resin-coated polyester then being applied to the starch. The natural resin, while not chemically reacting with the starch or polyester, has been discovered to act as an adhesive by virtue of its possessing a solubility parameter intermediate to that of the starch and polyester.

In accordance with this discovery, it is an object of the invention to provide a means of creating water-resistant biodegradable starch-based products.

Another object is to provide a means of effectively adhering polyester films to starch-based substrates.

Other objects and advantages of the invention will become readily apparent from the ensuing description.

DETAILED DESCRIPTION OF THE INVENTION

The present invention involves the coating of biodegradable starch-based products with water-resistant biodegradable polyester films wherein the adherence of the two dissimilar substrates is markedly enhanced by the presence of an intervening layer of a natural resin. While not wishing to be bound by a particular theory, it is believed that the hydrophilic carboxyl and hydroxyl groups of the resin can hydrogen bond to the starch while the hydrophobic portion of the resin can interact with the polyester; with this "bridging effect" of the resin serving as the basis for enhanced interfacial compatibility between the normally incompatible starch and polyester substrates.

Another explanation for the enhanced compatibility of the discrete starch and polyester constituents within the same product is based on the fact that the resins, comprising the layer which intervenes between the starch and polyester, possess a degree of hydrophobicity intermediate to that of the other two materials. This value can be quantitated by means of the solubility parameter δ which is defined as:

$$\delta = (\Delta E_v/V)^{1/2}$$

where $E_v$=energy of vaporization (J/mole) and V=molar volume (cm$^3$/mole)

Higher values represent increasing degrees of polarization with smaller values representing increasing degrees of hydrophobicity. Starch typically has a value of δ=43 (J/cm$^3$)$^{1/2}$ and polyesters have a value of δ≈ 20. The resins of the instant invention have values for the solubility parameter δ ranging from about 23 to about 33.

Suitable starches that may be used as sources for the biodegradable starch substrate include those from corn, wheat, rice, oat, potato, tapioca, arrowroot, sorghum, sago and pea. Of particular interest are those of corn, potato, wheat and rice. Starch additives such as plasticizers, strengthening agents, melt-flow accelerators and nucleating agents may be incorporated into the starch to improve its properties. Exemplary plasicizers include polyhydroxy compounds (e.g. glycerol, propylene glycol); carboxylic acids and their derivatives (e.g. citric acid, citrate esters); and amines (e.g. choline chloride, triethanolamine). Exemplary strengthening agents include cellulose derivatives (e.g. carboxymethyl cellulose, hydroxyethyl cellulose) and vinyl alcohol copolymers (e.g. poly[vinyl alcohol-co-vinyl acetate]). Useable melt-flow accelerators include fats and fatty acid derivatives of mono- and polyhydroxy compounds. Useable nucleating agents for creation of foams include silicas and talcs.

Water-resistant biodegradable polyesters useable with the instant invention include poly(hydroxycarboxylic acids) of the general formula:

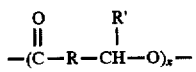

where R=—(CH$_2$)$_a$— with a=0 to 30
R=—H or —(CH$_2$)$_b$—CH$_3$ with b=0 to 30;
and where x=a whole numnber with a value greater than 1 polyesters formed from aliphatic or aromatic diacids and diols of the general formula:
and x=a whole number with a value greater than 1

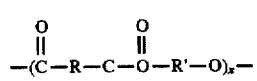

where R=—C$_6$H$_4$— or —(CH$_2$)$_a$— with a=1 to 30 and R'=—(CH$_2$)$_b$— with b=1 to 30; aliphatic polycarbonates of the general formula:

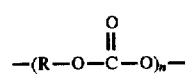

where R=—(CH$_2$)$_n$— with n=1 to 20; and aliphatic/aromatic copolyesters containing terephthalic acid in amounts less than about 60% by weight.

Useable aliphatic poly(hydroxycarboxylic acids) include poly(hydroxybutyric acid), poly(hydroxyvaleric acid), poly (hydroxypropionic acid), poly(ε-caprolactone), poly(lactic acid), poly(glycolic acid) and copolymers thereof. Useable polyesters formed from aliphatic diacids and diols include poly(ethylene succinate), poly(butylene succinate), poly (ethylene adipate), poly(butylene adipate), poly(ethylene glutarate), poly(butylene glutarate) and copolymers thereof. Useable aliphatic polycarbonates include poly(ethylene carbonate). Useable aliphatic/aromatic copolyesters include poly(dimethylene-terephthalate-co-dimethylene-hexanedioate), poly(trimethylene-terephthalate-co-trimethylene-hexanedioate), poly(trimethylene-terephthalate-co-trimethylene-decanedioate) and poly (tetramethylene-terephthalate-co-tetramethylene-hexanedioate).

Resins useable with the instant invention include shellac (insect resin), rosin, dammars, manila copals, gum elemi, sandarac, mastic, accroides (tree and plant resins), east India, kauri, and congo (fossil resins). Plasticizers such as esters of organic acids may be added to the resins; with useable compounds including acetyltriethyl citrate, diethyl adipate, glycerol triacetate and polyoxyethylene sorbitan monostearate.

Coating of the starch-based material with the layers of resin and polyester may be accomplished by any art-known means, with solvent-based coating, powder coating, film coating and extrusion coating being particularly envisioned. While the polyester layer must be essentially continuous in order for effective functioning of the invention, such is not the case for the resin layer where the degree of coverage at the starch/polyester interface may be as low as about 20% in order to promote acceptable levels of adherence. Desired application rates for the resin are from about 0.1 to about 50 g/m$^2$ of starch material with rates ranging from about 1 to about 10 g/m$^2$ being preferred. Application rates envisioned for the polyester component are from about 1 to about 200 g/m$^2$ of starch material with rates ranging from about 15 to about 100 g/m$^2$ being preferred. It should be noted that, for both the resin and polyester components, approximately each gram of material applied per square meter results in a 1 micron increase in film thickness.

Solvent-based coating is typically accomplished by subsequent coating of the solvated resin and polyester to the starch by any conventional means such as dipping, spraying, and brushing. At each stage the coating is dried by conventional means such as exposure to ambient air for several minutes, with the option to speed the process by use of forced air and/or elevated temperatures (e.g. 50° C. for 10–60 seconds).

Resin concentrations in the resin coating solutions range from about 5–50% by weight, with a preferred range of about 10–30% by weight. Useable resin solvents include aliphatic alcohols, glycols and glycol ethers. Exemplary compounds include methanol, ethanol, propanol, isopropanol, butanol and glycols such as propylene glycol and glycol ethers.

Polyester concentrations in the polyester coating solutions range from about 2–30% by weight, with a preferred range of about 5–20% by weight. Useable polyester solvents include aromatic and chlorinated hydrocarbons and ethers. Exemplary compounds include toluene, tetrahydrofuran, chloroform, trichlorobenzene and trichloromethane. Low molecular weight esters may be added as plasticizers at concentrations ranging from about 0.1 to about 30% by weight to the solvated polyester. Esters useable in this capacity include triacetin, acetyltriethyl citrate, acetyltributyl citrate, glycerol fatty esters, and esters of diacids such as adipic and suberic acid.

Powder coating of the polyester onto the resin-coated starch may be accomplished by use of finely powdered polyesters in a fluidized bed air sprayer where opposite electrostatic charges are given to the polyester and starch. The spray coated material is then heated to temperatures above the melting point of the polyester for about 1 to about 5 minutes to melt and create a continuous coating of the polyester upon the resin-coated starch. An alternate technology available to the artisan involves the use of a flame sprayer in which powdered polyester is mixed with a flammable gas (e.g. propane) and air. In this approach, flame-melted particles of the polyester adhere to the starch on contact.

Film coating may be accomplished by blowing or casting a polyester film and then melting the film to the resin-coated starch film or foam. Alternatively, a laminated polyester/resin film preformed by coating the polyester with resin (aqueous emulsion coating or coextrusion lamination) could be thermally sealed to the starch film or foam.

Finally, polyester coated starch films and foams could be prepared in one step by multilayer coextrusion lamination. Using this well-known extrusion technology, the starch, resin and polyester are extruded simultaneously to form a five layer structure with the starch in the center, a resin layer covering both sides of the starch and a polyester layer covering the exterior face of the resin coatings.

The following examples are intended to further illustrate the invention and are not intended to limit the scope of the invention which is defined by the claims.

All percentages herein disclosed are by weight unless otherwise specified.

EXAMPLE 1

Starch foam trays from Franz Haas were coated with a solution of 20% poly($\epsilon$-caprolactone)(PCL, Union Carbide P767P) in tetrahydrofuran (THF). The PCL coating spontaneously detached from the starch tray within minutes after drying. Another tray was first spray coated with a 12.5% solution of shellac (Bradshaw-Praeger Co., food grade refined) in ethanol and let dry. The PCL solution was applied next. PCL adhered well to the shellac coated tray — no peeling or delamination was evident. Weight of the starch tray before coating was 29 g. The weight of the shellac and PCL coatings was approximately 0.4 and 4 g, respectively. To simulate fresh meat storage, 100 ml of water was added to such a coated tray, the tray was sealed in a polyethylene bag and the bag placed in a refrigerator for 2 days. At the end of 2 days, the coated tray had gained 12% water but was still rigid and retained its shape. The shellac/PCL coating remained adherent. Uncoated or shellac coated trays similarly tested completely lost their shape or broke apart and absorbed hundreds of percent by weight in water.

EXAMPLE 2

A starch tray was coated with a solution of 10% poly(hydroxybutyrate-co-hydroxyvalerate) (PHBV, 12% valerate, Zeneca Biopol) in chloroform and let dry. The PHBV coating spontaneously delaminated from the tray within minutes after drying. A second tray was first coated with shellac as in Example 1 and then coated with PHBV solution. No delamination was evident. Tray weight was 13.7 g before coating and 15.9 g after. To simulate hot food or drink contact, 100 ml of boiling water was added to the tray and allowed to sit for 24 hours. After this time, the tray gained only 6% water by weight and remained rigid and useful.

EXAMPLE 3

Thirty-five grams of PHBV (22% valerate) powder was suspended in 80 g of methanol and sprayed onto the surface of a starch tray. The tray was then heated to 180° C. for 3 minutes to give a continuous PHBV coating. After storage of the coated tray for 24 hours at 23° C. and 50% relative humidity, the PHBV coating delaminated from the starch surface. A tray, which was first coated with shellac as in Example 1 and then coated with PHBV powder and melted, showed no coating delamination after several months storage.

EXAMPLE 4

Thirty-five grams of PHBV (22% valerate) powder and 3 g of shellac were suspended in 80 g of methanol and sprayed onto the surface of a starch tray. The tray was then heated to 180° C. for 3 minutes to give a continuous PHBV coating. After storage of the coated tray for 24 hours at 23° C. and 50% relative humidity, the PHBV coating remained adherent to the starch surface. Tray weight was 15.1 g and coating weight 5.1 g. After addition of 100 ml boiling water and a 2 hour time interval, the tray gained 5% water.

EXAMPLE 5

A starch tray was sprayed with a solution of rosin (15% in ethanol) and allowed to dry until slightly tacky. PCL powder was then added to the tray and the excess poured off. The tray was then heated to 120° C. for 1 minute to give a continuous coating of PCL. The PCL coating was adherent and difficult to pull off the tray. In contrast, a PCL coating pulled off easily from a tray with no rosin coating.

EXAMPLE 6

A solution of 12% PCL and 8% rosin in THF was brushed onto the surface of a starch tray and left to air dry. The coating remained adherent to the starch after standing for 1 day at 23° C. and 50% relative humidity.

We claim:

1. Water-resistant film and foam products based on gelatinized starch comprising:

a) an inner core comprising gelatinized starch;

b) an intermediate layer of a natural resin; and c) an outer layer of a water-resistant biodegradable polyester.

2. The product of claim 1 wherein said starch is selected from the group consisting of corn starch, potato starch, wheat starch, rice starch, tapioca starch, arrowroot starch, sorghum starch, sago starch, pea starch or mixtures thereof.

3. The product of claim 2 wherein said starch is selected from the group consisting of corn starch, potato starch, wheat starch, rice starch or mixtures thereof.

4. The product of claim 1 wherein said natural resin has a solubility parameter intermediate to that of said starch and said biodegradable polyester.

5. The product of claim 4 wherein said natural resin is selected from the group consisting of shellac, rosin, dammars, manila copals, gum elemi, sandarac, mastic, accroides, east India, kauri, congo or mixtures thereof.

6. The product of claim 5 wherein said natural resin is selected from the group consisting of shellac and rosin.

7. The product of claim 1 wherein said biodegradable polyester is selected from the group consisting of compounds of the formulas:

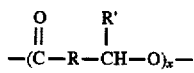

where R=—$(CH_2)_a$— with a=0 to 30 R'=—H or —$(CH_2)_b$—$CH_3$ with b =0 to 30; and x=a whole number with a value greater than 1

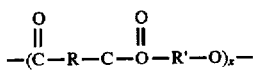

where R=—$(CH2)_a$— with a=1 to 30 and R'=—$(CH2)_b$— with b=1 to 30; and x=a whole number with a value greater than 1

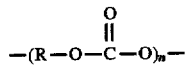

where R=—$(CH2)_n$— with n=1 to 20;
and aliphatic/aromatic copolyesters containing terephthalic acid in amounts less than about 60% by weight.

8. The product of claim 7 wherein said biodegradable polyester is selected from the group consisting of poly(hydroxybutyric acid), poly(hydroxyvaleric acid), poly(hydroxypropionic acid), poly(ε-caprolactone), poly(lactic acid), poly(glycolic acid), poly(ethylene succinate), poly(butylene succinate), poly(ethylene adipate), poly(butylene adipate), poly(ethylene glutarate), poly(butylene glutarate) and copolymers thereof.

9. The product of claim 8 wherein said biodegradable polyester is selected from the group consisting of poly(β-hydroxybutyrate-co-valerate), poly(lactic acid), poly(ε-caprolactone) or mixtures thereof.

* * * * *

UNITED STATES PATENT AND TRADEMARK OFFICE
CERTIFICATE OF CORRECTION

PATENT NO. : 5,756,194
DATED : May 26, 1998
INVENTOR(S) : Randal L. Shogren; John W. Lawton It is certified that error appears in the above-identified patent and that said Letters Patent is hereby corrected as shown below:

Column 3, line 43 should read:

$$R' = -H \text{ or } -(CH_2)_b-CH_3 \text{ with } b = 0 \text{ to } 30;$$

Column 3, lines 49, 50 and 51 should read:

$$-(\underset{\underset{O}{\|}}{C}-R-\underset{\underset{O}{\|}}{C}-O-R'-O)_x-$$

Column 7, lines 2, 3 and 4 should read:

$$-(\underset{\underset{O}{\|}}{C}-R-\underset{\underset{O}{\|}}{C}-O-R'-O)_x-$$

Signed and Sealed this

First Day of September, 1998

Attest:

BRUCE LEHMAN

*Attesting Officer*    Commissioner of Patents and Trademarks